Oct. 4, 1938.   J. M. OLDHAM   2,132,043
FILM REEL
Filed Aug. 31, 1935

INVENTOR.
John M. Oldham
BY Chappell & Earl
ATTORNEYS

Patented Oct. 4, 1938

2,132,043

UNITED STATES PATENT OFFICE 2,132,043

FILM REEL

John M. Oldham, Detroit, Mich., assignor to Leonard A. Young, Detroit, Mich.

Application August 31, 1935, Serial No. 38,773

6 Claims. (Cl. 242—70)

The main objects of my invention are:

First, to provide a film reel embodying a self-contained locking feature for the side plates thereof, thereby avoiding screws and clamping devices.

Second, to provide a film reel of exceptional sturdiness.

Third, to provide a film reel in which the customary tube supporting the same on a rotating driving member is eliminated.

Fourth, to provide a film reel characterized by an increased ease of assembly and permanence of construction when assembled.

Objects relating to details and economies of my invention will appear from the description to follow. The invention is defined and pointed out in the claims.

Preferred embodiments of my invention are illustrated in the accompanying drawing, in which.

Figure 1:
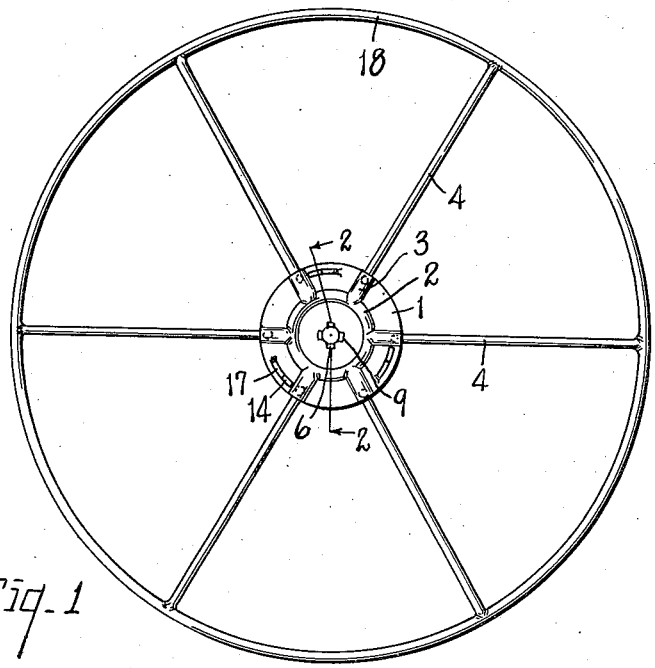
Fig. 1 is an elevation of an assembled film reel according to my invention.

My invention supplies an improved film reel for use in a motion picture apparatus, which is characterized by decidedly greater strength than the devices now in use without, however, relying on a greatly increased number of parts or increased cost for the added strength.

A feature of my invention lies in the fact that the number of parts has been decreased, thereby cutting the assembly time to a minimum, as well as materially decreasing the cost of the completed article. Ease of assembly is attained not only by the decreased number of parts, but also by the nature of the elements of my improved device, which carries the locking elements therefor directly on the side plates thereof.

Referring to the drawing, the reference numeral 1 indicates a centrally apertured side plate or spoke flange preferably of circular shape, of which there are two on my reel. The plates 1 are provided with circular raised portions 2 and radially extending raised portions 3 which form channels in the inner side of said plates. In the channels are placed the spokes 4, there being a number of channels corresponding to the number of spokes. A central tubular hub portion 5 is provided with projecting lugs 6 at each end which extend into keyways 7 on the plates 1, and slots 8 are formed in the tubular portion, said slots being in alinement with corresponding slots 9 in plate 1. The driving shaft for my reel is received in the hub 5 and is provided with a suitable projection extending in slots 8 and 9 to form a driving connection with the hub 5 and plates 1 of the reel. Two small reinforcing plates 10 having an aperture and slots registering with the aperture and slots of plate 1 may be attached to the plates 1 by spot welding as indicated at 11. These plates 10 materially strengthen the side places 1 and help carry the driving load. The plates 10 may, however, be omitted if desired.

Figure 7:
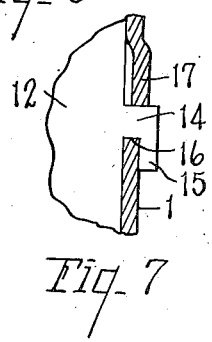

The reference numeral 12 indicates a winding drum having a slot or recess 13 therein, in which the film which is wound on the drum may be secured. The drum 12 is provided with L-shaped fingers or lugs 14, there being a suitable number of such fingers. In the device illustrated, three fingers have been used. Each finger carries an extending portion 15. The side plates 1 have a number of slots 16 therein disposed near the periphery of the plates, said slots being formed by a punching or similar operation, and a lip 17 adjacent the slots and protruding outwardly from the plate 1. In the assembly of the reel, fingers 14 are inserted in slots 16, the extending portion 15 of the fingers being placed so as to closely overhang the adjacent edge of plate 1. Lip 17 is then hammered down, as shown in Fig. 7, to firmly lock the finger 14 in place. It will be apparent that by this operation spokes 4 will be firmly secured between winding drum 12 and plates 1. At the outer end of spokes 4, a rim 18 is welded thereto.

By the above construction, all screws and clamping devices are obviated and a device of simple yet strong construction is provided. Reinforcing plates 10 which are welded to plates 1 greatly strengthen the same to withstand shock and load.

Figure 8:
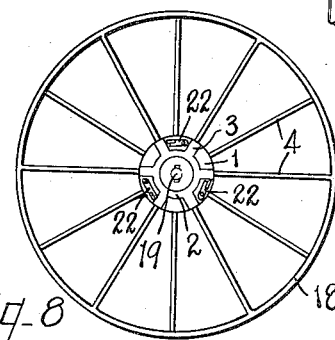
Fig. 8 is an elevational view of an alternate construction.

In Fig. 8 I have illustrated an alternative form in which spokes 4 are in staggered relation on opposite sides of the winding drum instead of being in parallel relation as shown in Fig. 1. The advantage of the form shown in Fig. 8 lies in the fact that more points of resistance to distortion are present in case the reel is accidentally dropped or roughly handled.

Figure 2:
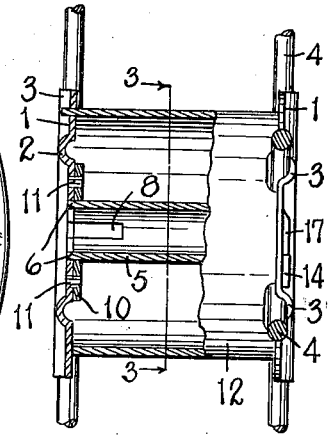
Fig. 2 is an enlarged sectional view taken on the line 2—2 of Fig. 1, parts being broken away.
Figure 4:
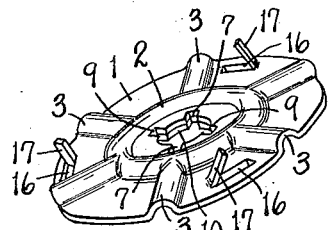
Fig. 4 is a perspective view of a side plate or hub flange embodied in my reel.
Figure 5:
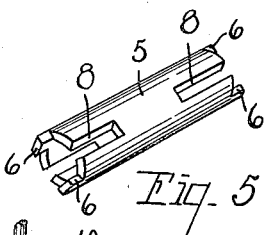
Fig. 5 is a perspective view of the hub element of my device.
Figure 6:
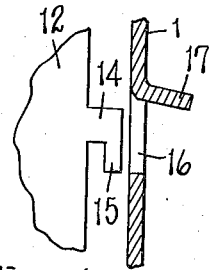
Figs. 6 and 7 are detail views illustrating the method of assembling my improved reel, parts being cut away.
Figure 3:
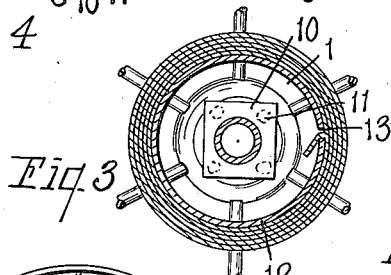
Fig. 3 is a view taken on the section line 3—3 of Fig. 2, a few convolutions of film being indicated thereon.
Figure 9:
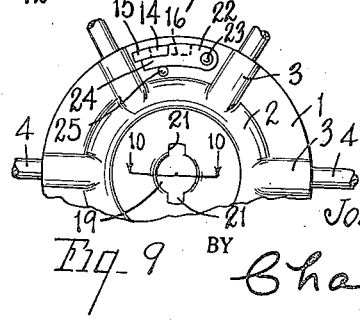
Fig. 9 is a detail view illustrating a modification, parts being cut away.

In Fig. 9 a modification is illustrated in which the central hub 5 of Figs. 1, 2, and 5 is omitted. In this modification plate 1 is apertured as indicated at 19 and provided with struck out flanges 20 which constitute the hub. The flanges and plate are provided with keyways 21 and the lugs of the driving member for the reel are received directly in said keyways. The device of this modification therefore dispenses with the central tubular hub member 5 and thus effects a decided saving in the cost of production of the reels as well as greatly facilitating the manufacture thereof. I am unaware that such a feature has ever been proposed before.

Figure 10:
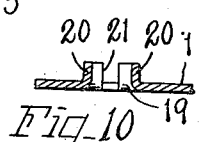
Fig. 10 is a sectional view on the line 10—10 of Fig. 9, parts being cut away.

It will be apparent that the feature constituted by the elimination of tubular hub member 5 may be employed in connection with locking structure for the side plates and winding drum, such as is illustrated in Figs. 1 to 7, inclusive. However, I have shown in Figs. 8, 9 and 10 a modified form of locking structure which comprises a resilient retaining member or dog 22 pivoted to plate 1 at 23. The retaining member is shaped as shown at 24 to retain finger 14 when in operative relation thereto. In this modification, an aperture 16 is formed in the plate 1, but the protruding lip 17, shown in Figs. 1, 4, 6, and 7, is omitted. A small projection or dent 25 is formed in plate 1 to hold retaining member 22 in operative position. Member 22 snaps over dent 25 into contact with finger 14 once finger 14 is in its final position. The alternative feature comprising the pivoted resilient retaining member 22 is illustrated as being used in connection with the inturned flanges 20 and keyways 21 of Figs. 9 and 10. However, it will be apparent that it is capable of being employed in combination with any device to lock the side plates 1 to the driving member therefor.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a film reel, a tubular hub adapted to receive a driving member for the reel, a pair of plates secured to the ends of said hub, said plates having punched out slots and struck out lips adjacent said slots, a winding drum disposed between said plates provided with fingers at the ends thereof, a portion of said fingers being spaced from the drum and extending in the direction of the drum periphery, said fingers being received in said slots and held therein by said lips, said plates being further provided with rounded channels extending radially thereof, and spokes confined in said channels between said drum and said plates.

2. In a film reel, a pair of plates, said plates having slots and integral bendable retaining members adjacent said slots, and a winding drum disposed between said plates, said drum having preformed rigid L-shaped fingers at the ends thereof disposed in said slots and held therein by said retaining members, a portion of said fingers being spaced from the drum and extending longitudinally in the direction of the drum periphery with said retaining members engaging the rear of the fingers, said plates being further provided with rounded channels extending radially thereof between said slots, and spokes confined in said channels between said drum and said plates.

3. In a film reel, the combination of a tubular hub adapted to receive a driving member for the reel, a pair of hub plates secured to the ends of said hub, said plates having radial ribs struck up therefrom providing inwardly facing spoke receiving channels and an annular rib at the inner ends of said radial ribs, said plates having slots therein between certain of the radial ribs with integral bendable lips at one end of each slot, a winding drum disposed between said hub plates and provided with a longitudinal film receiving slot and with hooked lugs having portions spaced from and extending substantially in the direction of the drum periphery, said lugs engaging in said slots in said hub plates with a bayonet locking engagement and being secured therein by said bendable lips, and spokes secured in said spoke channels between the ends of said drum and said plates.

4. In a film reel, the combination of a pair of plates adapted to be drivingly connected with a driving member for the reel, said plates having radial ribs struck up therefrom providing inwardly facing spoke receiving channels, said plates having slots therein between certain of the radial ribs with integral bendable lips adjacent each slot, a winding drum disposed between said hub plates and provided with slotted lugs having portions spaced from and extending substantially in the direction of the drum periphery, said lugs having bayonet locking engagement in said slots in said hub plates and being secured therein by said lips, and spokes secured in said spoke channels between the ends of said drum and said plates.

5. In a film reel, the combination of a tubular hub, end plates secured to the ends of said hub and having spaced slots adjacent the periphery thereof, a winding drum disposed between said plates and provided with lugs slotted at their forward end and engaged in said slots to form a bayonet locking connection, said end plates being provided with bendable locking members for securing said lugs in said slots by engaging the rear of the lugs, and spokes having their ends disposed between said end plates and drum and secured to said plates.

6. In a film reel, a hub adapted to receive a driving member for the reel, a pair of side plates secured to the ends of said hub, said plates having slots therein and integral struck out lips adjacent said slots, a winding drum for said reel, slotted fingers at the ends thereof, said fingers being received in said plate slots with a bayonet locking engagement and held therein by said lips, there being circumferentially spaced radially extending spoke receiving channels between said plates and drum, and spokes disposed in said channels.

JOHN M. OLDHAM.